INVENTORS
HALLETT R. STILES
JOHN D. VINATIERI
BY George J. Rubens
ATTORNEYS

United States Patent

Stiles et al.

[15] 3,636,268

[45] Jan. 18, 1972

[54] HIGH-SPEED RAPID RESPONSE INTERCOMMUNICATION SYSTEM

[72] Inventors: Hallett R. Stiles; John D. Vinatieri, both of San Diego, Calif.

[73] Assignee: The United States of America as represented by the Secretary of the Navy

[22] Filed: Oct. 6, 1969

[21] Appl. No.: 864,080

[52] U.S. Cl. .......... 179/37

[51] Int. Cl. .......... H04m 9/06

[58] Field of Search .......... 179/1 H, 37, 35, 40

[56] References Cited

UNITED STATES PATENTS

| | | | |
|---|---|---|---|
| 1,782,847 | 11/1930 | Grandin | 179/37 |
| 2,007,990 | 7/1935 | Waite | 179/40 |
| 2,009,470 | 7/1935 | Auth | 179/40 |
| 2,561,946 | 7/1951 | Pedatella | 179/37 |
| 3,023,273 | 2/1962 | Liberman | 179/1 H |

*Primary Examiner*—Kathleen H. Claffy
*Assistant Examiner*—Thomas L. Kundert
*Attorney*—J. C. Warfield, Jr., George J. Rubens and John W. McLaren

[57] ABSTRACT

A rapid response intercommunication system is disclosed. A plurality of intercom stations among which audio connections are required are connected to a central switching unit wherein novel digitally controlled switching circuitry is selectively actuated by a calling station to thereby automatically establish two-way audio paths between the calling station and a selectively predetermined number of called stations without any action being required on the part of the called stations. Monitoring means are provided at the calling station whereby the calling station can monitor the called stations to prevent the calling station from interrupting any conversation that may be in progress between the called stations and other stations. Means are also provided at the calling station and at each called station such that any station can cut off the audio connection between it and the calling station. The calling station can also automatically establish a party line among a selectively predetermined number of called stations.

1 Claims, 3 Drawing Figures

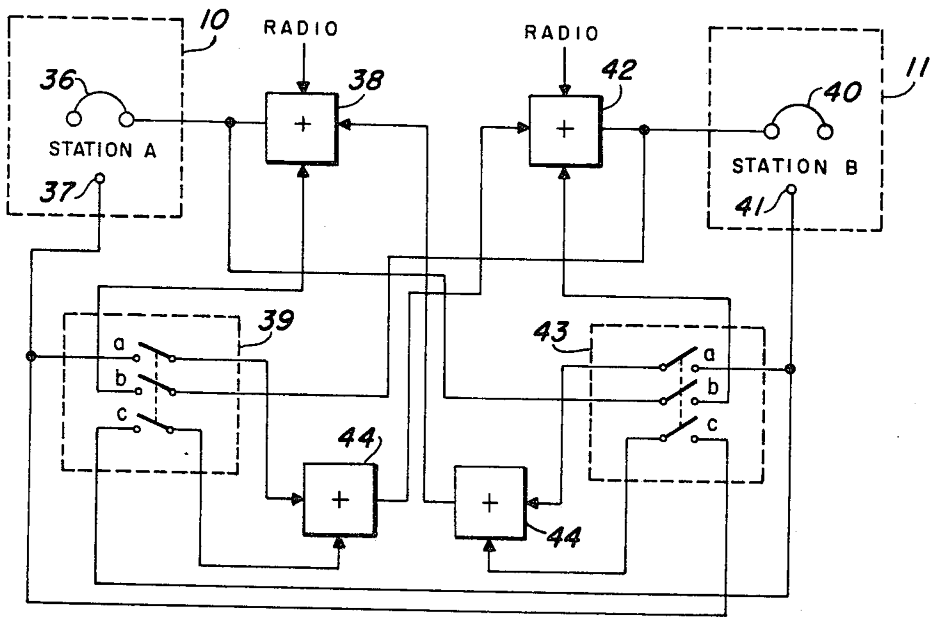

INVENTORS
HALLETT R. STILES
BY JOHN D. VINATIERI

ATTORNEYS

HIGH-SPEED RAPID RESPONSE INTERCOMMUNICATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Within a carrier-air-traffic control center (CATCC), there is a definite need for a rapid response intercommunication system. CATCC is composed of both air operations and carrier control approach. The primary purpose of air operations is to coordinate and schedule the flight operations of aircraft on ships and to furnish pertinent information to the pilots of these aircraft. Because air operations personnel do not actually control air traffic, air operations must maintain close coordination with carrier control approach to efficiently perform their duties. Furthermore, the air controllers of the carrier control approach must be able to communicate among themselves at a rate dictated by the speed at which the aircraft are landing. Since normally the aircraft are landing rapidly, the intercom used in carrier control approach must have a rapid response to permit each of the controllers to rapidly obtain information which is vital to the safety of the aircraft under his control. This requirement is especially evident when there is a wave-off. In this situation, the supervisor, approach controller, final controller, and bolt wave-off controller must be able to rapidly exchange information to ensure the safety of the aircraft. Therefore, it can be seen that there is a need for a rapid response intercommunication system within a carrier-air-traffic control center.

An existing intercom system has several limitations and disadvantages. This intercom is a call up and answer type system in which the called operator must answer the calling operator in order to establish the desired two-way communication. Since the called operator must answer a call addressed to his station in order to receive the transmission, the response time is necessarily slow for carrier-air-traffic control communications uses. Furthermore, operators can be preoccupied with other functions which are necessary to the performance of their overall duties, and may not have time to answer the intercom, or if they take the time to answer the intercom, they may not be able to carry out other routine procedures of their stations. Therefore, it would be desirable to have an intercom that requires no action on the part of the called party.

This existing intercom has also been modified into a party line system in which all stations are continuously monitoring a circuit. That is, all stations can hear anything being said by any station in the system. This system does provide a fast response time as well as some monitoring facilities, however, the remaining stations in the system are simultaneously listening to the conversations between other stations whether they want to or not. Furthermore, this system does not offer any isolation in that every station is monitoring a system in which several conversations may be taking place at the same time. Consequently, it is necessary for each station to filter out all conversations except those which are intended for that station. As a result, a station often does not receive a message because of excessive talking on the circuit.

SUMMARY OF THE INVENTION

A rapid response intercommunications system is disclosed. This system comprises a plurality of intercom stations among which two-way or party line audio connections are required. The stations are connected to a central switching unit by multiconductor cables. The switching unit includes digitally controlled switch means which are connected between each possible two-way audio path between each of the several stations. The digitally controlled switch means can be selectively actuated by a calling station to thereby automatically provide a two-way audio path between the calling station and a selectively predetermined called station, i.e., no action is required on the part of the called party to establish the audio path. Monitoring means are provided at the calling station to enable the caller to monitor the called station to prevent the caller from interrupting any conversation that may be in progress between the called station and a third station. Furthermore, means are provided at the calling station and at the called station so that either station can cut off the audio connection between the two stations if, for example, the called station is engaged in a conversation with a third party. Indicator means are provided at both stations to provide an indication of the audio connections which have been established. A calling station can automatically establish a two-way audio path between itself and a selectively predetermined number of called stations. Each of the called stations can then establish all possible audio paths between the called stations such that a party line is thereby established among the stations.

STATEMENT OF THE OBJECTS OF THE INVENTION

It is an object of the present invention to provide a rapid response intercommunication system in which the calling station can automatically establish an audio path without any action on the part of the called station.

Another object of the present invention is to provide a rapid response intercommunication system wherein a calling station can monitor and converse with one or several called stations simultaneously.

DESCRIPTION OF THE PREFERRED EMBODIMENT

Figure 1:
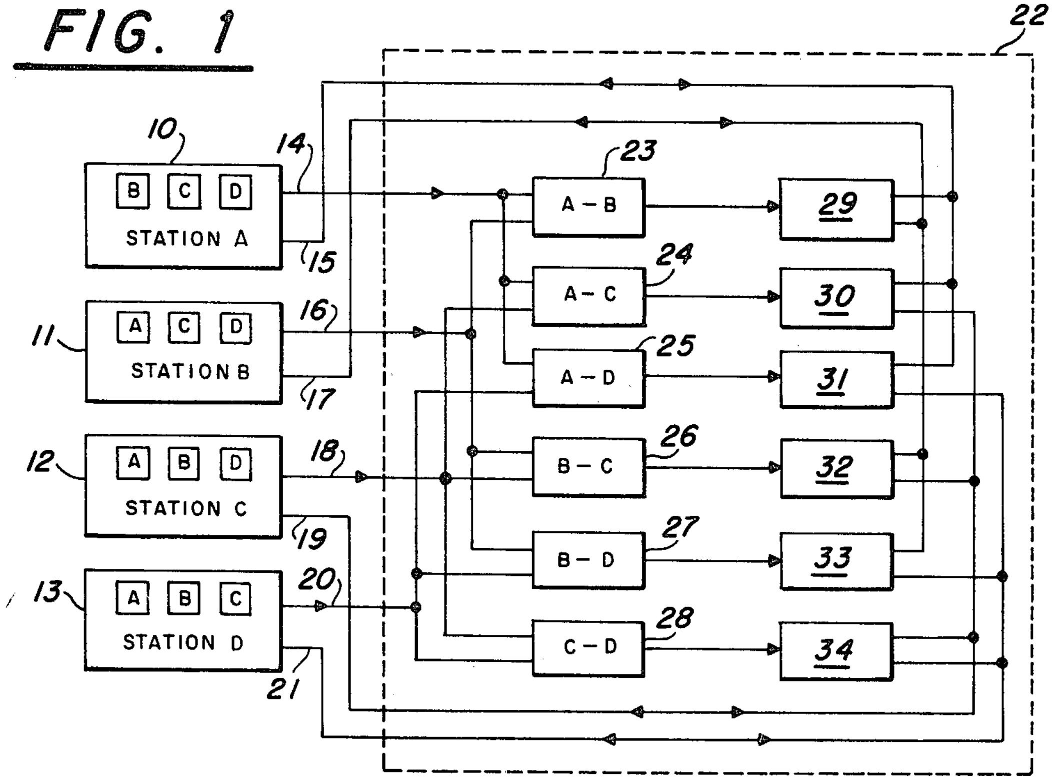
FIG. 1 is a block diagram of the basic communications system of the present invention.

In FIG. 1 an intercommunication system is shown as consisting of four stations shown as Station A, Station B, Station C, and Station D, and designated by the numerals 10, 11, 12, and 13, respectively. Station A is connected to a central switching unit 22 by means of the cables 14 and 15; Station B, by means of the cables 16 and 17; Station C, by means of the cables 18 and 19; and Station D, by means of the cables 20 and 21. Cable 14 from Station A is connected to the inputs of the integrated circuit logic cards 23, 24, and 25. Cable 16 from Station B is connected to the inputs of logic cards 23, 26, and 27. Cable 18 from the Station C is connected to the inputs of logic cards 24, 26, and 28. Cable 20 from Station D is connected to the input of logic cards 25, 27, and 28.

The outputs of the integrated circuit logic cards 23, 24, 25, 26, 27, and 28, which function as audiopath selectors, are connected to the switching assemblies 29, 30, 31, 32, 33, and 34, respectively. Station A is connected to the outputs of relay assemblies 29, 30, and 31 by means of cable 15; Station B is connected to the outputs of relay assemblies 29, 32, and 33 by means of cable 17; Station C is connected to the outputs of relay assemblies 30, 32, and 34 by means of cable 19; and Station D is connected to the outputs of relay assemblies 31, 33, and 34, by means of cable 21.

Each switching assembly 29–34 can, for example, include two relays connected in such a manner that the output of the corresponding logic card can be coupled to the input of either of these two relays. And as can be seen, there is a logic card for every possible two-way conversation that can exist among a given number of stations such that logic card 23 corresponds to an audio path between Stations A and B; card 24, to an audio path between Stations A and C; card 25, to an audio path between Stations A and D; card 26 to an audio path between Stations B and C; card 27, to an audio path between Stations B and D; and card 28 to an audio path between Stations C and D.

Thus, if Station A wishes to establish an audio path to Station B, an operator at the calling Station A depresses a control switch, which can be of the pushbutton type labeled B on his control console. This action causes a control voltage to be applied to logic card 23 through cable 14. The output of card 23, by means of a switching action to be described later, energizes one of the two relays of relay assembly 29 associated with that card and thereby completes the audio path desired. Thus when Station A energizes logic card 23, Station A has selected the logic card in the central switching unit 22 which corresponds to an audio path between Stations A and B.

According to the inventive concept, the calling station can monitor the called station's headset and microphone; for example, Station A can hear any existing two-way conversations between the called Station B and any third party. Thus, Station A has the capability of not interrupting any conversations existing between the called party and any third party. The called party cannot, however, monitor the calling station.

This monitoring capability is an integral part of the novel intercom system since it enables either party to terminate the audio path by merely selecting the appropriate control switch on his console. Thus, for example, if Station B is occupied with an existing call to Station C or D when it receives an indication that Station A is calling it, Station B, by merely actuating the switch B on its console, can terminate the audio connection between Station A and B. Station B thus effectively and rapidly indicates to Station A that it cannot communicate with it at that particular time.

The switches which are located at appropriate consoles at each of the stations are illuminated continuously to provide an indication of the audio paths established and of the condition of these paths. When a particular card has been selected, an appropriate button on both Stations can, for example, change color, thus giving both the calling station and the called station an indication of the audio connections established. If Station B is calling Station D, logic card 27 which corresponds to an audio path between Stations B and D is energized. Therefore, the switch D is illuminated on Station B's console and the switch B is illuminated on Station D's console. An illuminated switch on the called party's console can indicate to him that he is being monitored or called.

If Station A desired to establish a party system among Stations A, B, and C, Station A would call Stations B and C. This action would establish two-way audio connections between Station A and Station B and between Station A and Station C. No audio connection would be established by this action between Stations B and C. However, to establish a party line among the three stations, all that Station B has to do is to call Station C, or Station C can call Station B. Thus, it can be seen that for a party line to be established, all possible two-way connections among the stations desired on the party line must be made. However, since all that is required is actuating a few switches, a party line can be easily and rapidly established in a matter of seconds.

The switches at the control consoles can be of the momentary-action type with two indicator lamps. Also located at each console can be a radio selector switch, a dimmer control to change the intensity of the indicator lamps, a headphone volume control, and a microphone level control in addition to a VU meter to indicate the proper output level.

In the present system, the number of cards in the central switching unit 22 is an exponential function of the number of stations that are required to be mutually conversant. The number of other stations to which a particular station communicates determines the number of audio connections that must be established. The following equation shows the relationship between the number of switching functions required and the number of intercom stations which must be interconnected in a given system:

$$N=n(n-1)/2$$

where $N$ is equal to the number of logic cards, and $n$ is the number of stations.

Figure 2:
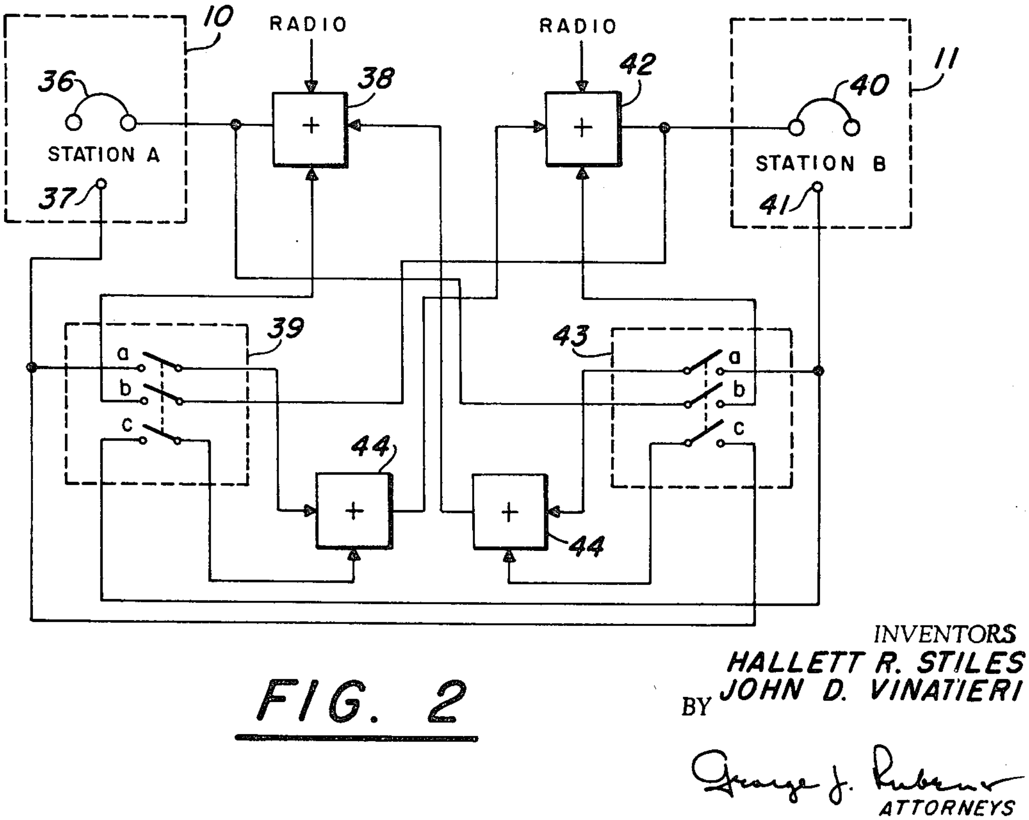
FIG. 2 is a simplified schematic diagram of a typical switching circuit for a two-party system embodying the concept of a present invention.

FIG. 2 is a basic schematic diagram of the switching circuit required to establish audio paths for a typical two party system. Since the interconnections become progressively more complex as additional stations are added, a two-party system will be utilized to explain the basic operation of the system.

In FIG. 2, a typical intercom station 10 is shown in simplified form as comprising a headphone 36 and a microphone 37. Headphone 36 is connected to a conventional headphone mixer 38, and the microphone 37 is connected to a three contact relay 39. Another station 11 is also shown in simplified form as comprising a headphone 40 and an associated microphone 41. The headphone 40 is connected to a conventional headphone mixer 42, and the microphone 41 is connected to the input of a relay 43.

It should be noted that relays 39 and 43 constitute the two relays in a typical switching assembly of the type shown as 29 through 34 in FIG. 1. Mixer 38 receives input signals from a conventional microphone mixer 44 and from contact *b* of relay 39. In the same manner, headphone mixer 42 receives input signals from microphone mixer 44 and from contact *b* of relay 43. The amplifier and logic circuits and various balancing lines and transformers have been omitted from FIG. 2 for the sake of clarity. If the entire system were shown in FIG. 2, there would be an additional input from the remaining stations to the headphones 36 and 40 and the microphone mixers 44. This should be remembered when monitor relationships are hereinafter discussed.

In operation, if Station A and Station B wish to communicate with each other, either relay 39 or 43 will be energized depending on which station initiates the communication. If Station A wishes to talk to Station B, Station A would select switch B on its control console. This switching action produces a control signal which is applied through cable 14 to logic card 23 of FIG. 1. The output of logic card 23, in turn, energizes the relay 39 of switching assembly 29 of FIG. 1. When the relay is energized, indicator means such as conventional lamps on both the calling stations and the called station's control consoles are illuminated. These lamp circuits are omitted on the schematic of FIG. 2. If Station B does not desire to talk with Station A, the operator at Station B merely depresses switch A on his console and thereby causes the logic card 23 to release the relay 39 and thus break the audio connection established by Station A.

When Station A calls Station B, relay 39 is energized and due to the audio connection thus established, Station A is able to hear any conversations involving Station B. Station B, however, can only hear Station A even if a third party is talking to Station A. The reason for this operational characteristic is due to the switching circuit devised for the preferred embodiment. When relay 39 is energized, the contact *a* connects the microphone 37 of Station A to the headphone 40 of Station B through the mixer 44. Contact *b* connects the headphone 40 of Station B to the headphone 36 of Station A through an amplifier (not shown). Thus it can be seen that the audio connection established through contact *b* of relay 39 allows Station A (the caller) to monitor Station B. Contact *c* connects the microphone 37 to the headphone 40 of Station B, providing side-tone at Station B.

Thus Station A hears Station B as well as its own side-tone through the headphone mixer 42, of Station B, thereby allowing Station A to monitor Station B. With only relay 39 to be energized, Station B can hear only Station A even if a third party is talking with Station A. This is true since the headphone 40 of Station B is not connected directly to the headphone 36 of Station A. It should be noted that the only signal applied to each headphone is that signal obtained through the respective headphone mixer 38 and 42. If a party line connection is required, the monitor relationship would still exist. The only basic change to FIG. 2 would be additional inputs to the headphone mixers 38 and 42.

If the situation were reversed, and Station B had called Station A, the same logic card 23 would be used, only this time it would energize relay 43 of switching assembly 29. The same fundamental circuit as previously described would then be established except that Station B would now monitor Station A. A conventional isolated amplifier (not shown) is required at each headphone in the system to enable the calling station to monitor the headphone of the called party. Otherwise the two headphones 36 and 40 would essentially be connected together, and thus either station could monitor the other station.

Figure 3:
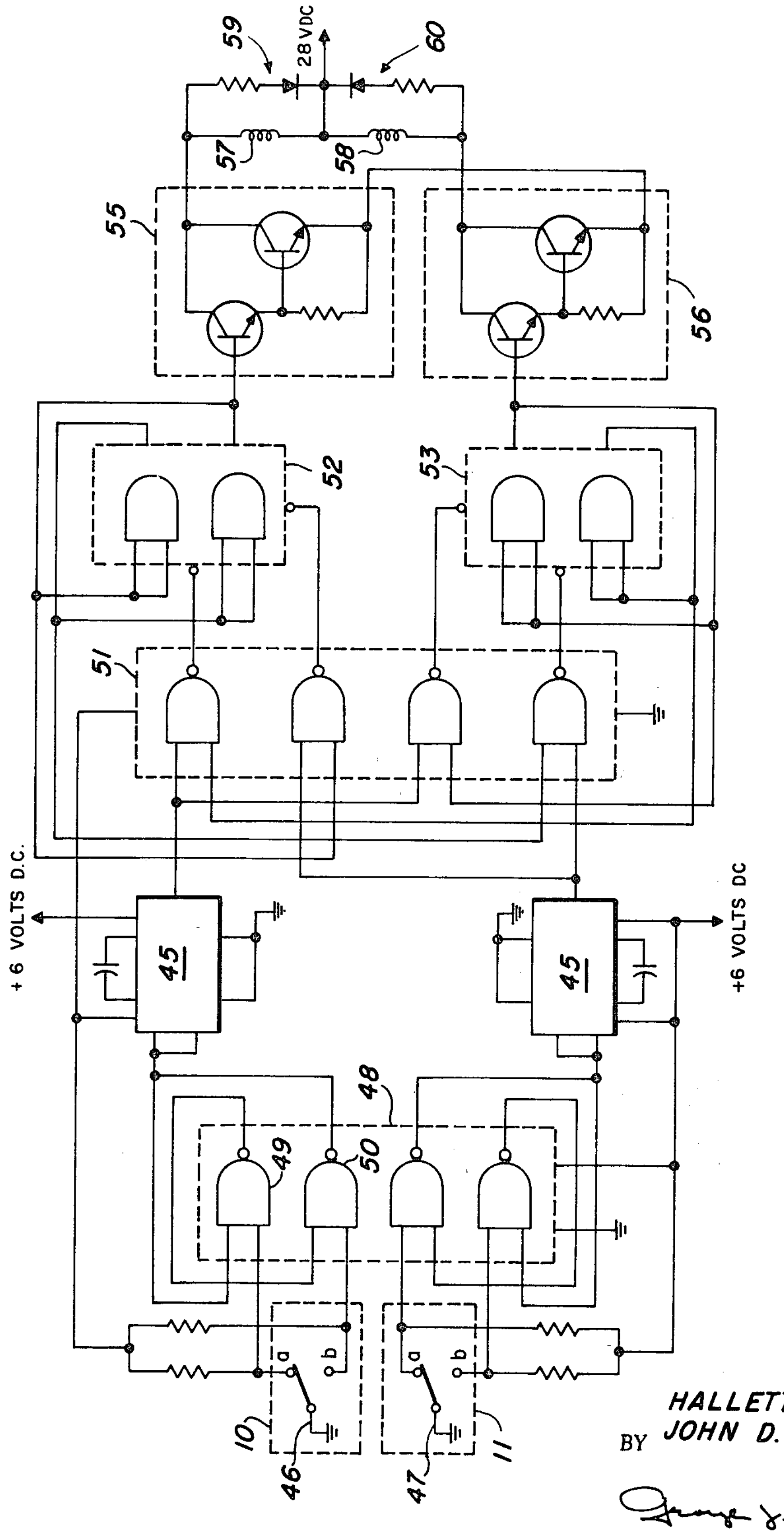
FIG. 3 is a simplified schematic diagram of the switching circuit required for a typical two-party system.

In FIG. 3, the novel integrated circuit logic card used in the present system is shown. A single pole, double-throw, momentary action pushbutton switch 46 having contacts *a* and *b* is shown as being functionally located within station 10. A like switch 47, is shown as being functionally located within station 11. Stations 10 and 11 correspond to Stations A and B of FIGS. 1 and 2. The output of switches 46 and 47 are connected to an AND-gate circuit 48. Gate 49 of circuit 48 is connected to the output of contact *a* of switch 46, and gate 50 is connected to the input of the monostable multivibrator 45. The output of multivibrator 45 is connected to a second AND-circuit 51. The output of AND-gate circuit 51 is in turn connected to the inputs of flip-flop circuits 51, 52, and 53. The binary outputs of the flip-flop circuits 52 and 53 are connected to the inputs of transistor-driver circuits 55 and 56, respectively. The outputs of the transistor-driver circuits 55 and 56 are connected across the coils 57 and 58 of relays 39 and 43 of FIG. 2, respectively. Connected across the relays 57 and 58 are the resistor-diode combinations 59 and 60.

The operation of the circuit of FIG. 3 can be described briefly. AND-gates 49 and 50 are connected to the output of the SPDT switch 46 which has its lever arm grounded. Assume that the normal position of the switch 46 is shown at *a* and that a logical "1" is considered to be some positive voltage and that a logical "0" is ground potential. For the normal position of the switch 46 as shown in FIG. 3, a "1" is placed at an input of AND-gate 50 and "0" at an input of AND-gate 49. By depressing the switch 46 to position *b* a "1" is now placed on the input of AND-gate 49 where "0" used to be. The output will remain a "1" as long as the switch 46 is in the *b* position. Therefore to prevent an operator in Station 10 from overriding the circuit by keeping his switch depressed, the output of AND-gate 50 is applied to a monostable, multivibrator 45. This circuit will produce a pulse independently of the length of time switch 46 is in the *b* position.

The arrangement of two AND gates for each switch 46 and 47 provides a method for triggering the monostable multivibrator 45 while at the same time eliminating the possibility of false triggering due to bounce on the switches. If these AND gates were not present, this bounce might possibly trigger the single-shot flip-flops 52 and 53 several times whenever the switch was depressed.

It should be noted that up to this point, the circuits are identical for each switch 46 and 47. The signal at the output of the multivibrator 45 is thus a pulse of limited duration whenever the respective switch is depressed. The resultant output pulses are applied as the inputs to a series of AND-gates 51 where the actual logic is performed. These AND-gates 51 in turn control the binary output state of the two flip-flops 52 and 53. The logic of these gates 51 is such that if switch 46 is depressed, flip-flop 52 will change from "0" to "1" and will remain in this state until either switch 46 or 47 is depressed. Thus the proper sequence is required at the switches to make the flip-flop circuits 52 and 53 change states. It should be emphasized that either, but not both, of the flip-flops may have a "1" at its output at any given instant of time. Thus the possibility of having both coils 57 and 58 energized simultaneously is eliminated. This feature is an inherent characteristic of the logic circuits.

Each flip-flop 52 and 53 energizes an associated relay. This is accomplished by means of the transistor-driver circuits 55 and 56 connected at the output of the flip-flop circuits 52 and 53, respectively. These transistor-driver circuits function as switches. That is, when a "1" appears at the output of one of the flip-flops, the "1" is applied to the base of the transistor and thereby used to bias the transistor into conduction. This allows collective current to flow and since the coils 57 and 58 of the relays are in series with the collector circuit, the coils are energized. Thus the audio circuits described in the preceding section are completed. Since there is a possibility of transistor damage due to the voltage surge created in the relay coils 57 and 58 when the collector current collapses because of transistor cutoff, a series resistor-diode combination 59 and 60 is connected across the coil to provide damping and thus protect the transistor from the voltage surges.

A microphone preamplifier should be provided for each station in the system. Due to the possibility of having long cable extensions from each station to the central switching unit, these amplifiers should be located at each station unit, thereby maintaining a higher signal-to-noise ratio in the system. These amplifiers can be constructed using integrated circuits and can be powered from a central switching unit. To reduce the possibility of noise pickup, a balanced 600 ohm line can be used from the output of each of these amplifiers to the central switching unit.

A power amplifier would also be required to drive the headphones, and it should include a headphone mixer, an automatic gain control amplifier, and an isolation amplifier. One of these circuits would be required for each station in the system.

Integrated circuits can be used throughout the audio circuits except for the isolation amplifier which can be a conventional transistor amplifier operated with unity gain. It has been found that an RCA 3020 integrated circuit amplifier provides a balanced output which can be called back to the station unit and headphone. The mixers can be designed around an operational amplifier used as a summer. Since the amplifier is adding it can conceivably be saturated by the application of a greater number of low-level signals to its input. It is for this reason that the gain from the operational amplifier should be kept at unity or less. The attenuation that occurs throughout the mixer is then picked up by the following amplifier stage. The operational amplifier provides a very linear method of mixing audio signals while at the same time maintaining good isolation between inputs.

The input impedance of the mixers is essentially equal to the value of the input resistors used. Therefore, in order to maintain good input isolation, the value of these resistors should be in the order of 10K ohms. As a consequence, transformers must be used to provide the power input impedance. However, these transformers would be required only for the microphone mixers where the output of the preamplifiers would be matched to the input of the mixers through 600 ohm lines. It has been found, for example, that as long as the output load on an operational amplifier is above 3K ohms no severe losses or distortions will occur. Therefore, transformers are not required at the input of the headphone mixers since these inputs come directly from the output of the microphone mixers and isolation amplifiers located in the same central switching unit.

Radio signals which an operator might wish to hear can be applied to a selector switch which would be located at the control console at his station. The output of this selector switch can be cabled to the central switching unit and applied as one of the inputs to the headphone mixer corresponding to this station. Thus by turning the selector switch, the operator can listen to the various radio circuits while at the same time using the basic intercom system.

A conventional pickle-foot switch can be used at each station to energize a relay having contacts which would allow the output of the microphone preamplifier to be connected to a radio transmitter and also to close transmitter keying circuits. Thus the operator may at all times listen to both the intercom and the radio, but he may not talk to both simultaneously. This feature prevents the double side-tone that can develop in the event the operator is allowed to talk to both simultaneously. As mentioned above, the radio signal obtained through the selector switch may be applied as one of the inputs to the appropriate headphone mixer as shown in FIG. 2. However, the radio signals applied to the headphone mixers would not necessarily be the same because each operator would determine the radio signal which would be applied to the headphone mixer associated with his station.

Thus, it can be readily seen that a new and novel rapid response intercommunication system has been disclosed. The system requires no action on the part of the called party to establish an audio connection and features a monitoring capability which allows the calling party to monitor the called party.

Obviously many modifications and variations of the present invention are possible in the light of the above teachings. It is therefore to be understood that within the scope of the appended claims, the invention may be practiced otherwise than as specifically described.

What is claimed is:

1. A digital, rapid response intercommunication system comprising:

a plurality of intercom stations which can operate as calling or called stations;

station selector means at each station;

first digital switching means connected between each station and every other station, said switching means being responsive to digital control signals produced by selective actuation of said selector means at a calling station to thereby automatically establish a two-way communications path between said calling station and a selectively predetermined called station;

means at each calling station for monitoring any called station to assure that existing conversations involving the called station are not interrupted;

means at each called station for automatically indicating to the called station the identity of a calling station and for automatically disabling the communication path established by the calling station; and second digital switching means connected to said stations for automatically establishing two-way, party line communication paths involving any or all of said stations.

* * * * *